UNITED STATES PATENT OFFICE.

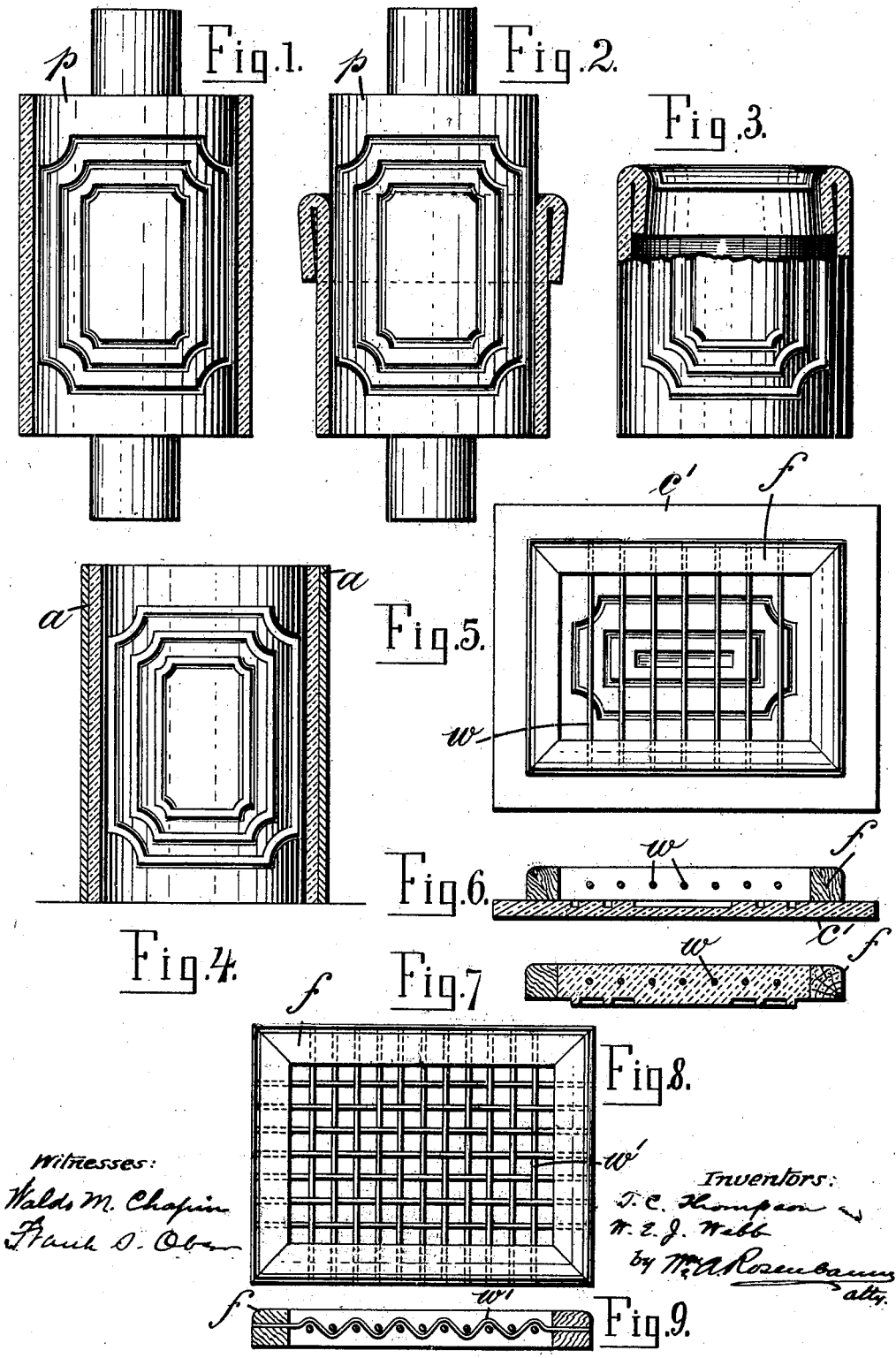

THOMAS CHARLES THOMPSON AND WILLIAM EDWIN J. WEBB, OF MANCHESTER, ENGLAND.

MANUFACTURE OF PRINTING-SURFACES.

SPECIFICATION forming part of Letters Patent No. 678,065, dated July 9, 1901.

Application filed February 21, 1901. Serial No. 48,278. (No model.)

*To all whom it may concern:*

Be it known that we, THOMAS CHARLES THOMPSON and WILLIAM EDWIN JOHN WEBB, subjects of the King of Great Britain, residing at Manchester, in the county of Lancaster, England, have invented certain new and useful Improvements in the Manufacture of Printing-Surfaces, of which the following is a full, clear, and exact description.

This invention relates to the production of printing-surfaces which are formed of materials or compositions which may be cast or molded of which the mixture of glue and glycerin used for printers' inking-rollers and gutta-percha are types. In such printing-surfaces the designs or subjects to be printed are at present cut or engraved in the material in intaglio or in relief, and when the surface becomes worn or damaged a fresh one has to be cut or engraved at considerable cost. Our object is to provide means whereby these printing-surfaces can be reproduced at a trifling cost in considerable numbers, if required. It is true that it has already been proposed to cast or mold such surfaces by known methods; but hitherto no useful technical or commercial result has been obtained. These improvements are of especial importance with regard to the production of cylindrical printing-surfaces for printing either in in intaglio, as in calico-printing, or from relief, as in letter-press printing. They are of great importance also in the production of flat printing-surfaces which are peculiarly well adapted for printing upon sheet metal, fictile wares, glass, wood, paper, cloth, and the like. Some of the difficulties attending the hitherto-proposed methods for producing these printing-surfaces are that air-bubbles and other flaws are produced in them during the act of manufacture, that the flat surfaces are inadequately supported, and that for the production of rollers expensive molds in several parts have to be made, with the result that fins or ridges are produced on the surface corresponding with the mold-joints. We entirely avoid these difficulties. In the production of a cylindrical surface according to these improvements we take or make a pattern-roller which would itself produce the required impression. This roller should be made of tin or be evenly and uniformly coated with tin before use. Instead of tin another metal may be used which will withstand the action of the sulfur in the vulcanizing process hereinafter described. This pattern-cylinder has its working surface coated or covered with a layer, which may be from two to five millimeters thick, of caoutchouc containing about twelve and one-half per cent. or somewhat less of sulfur. This caoutchouc covering is then vulcanized on the pattern-roller by the ordinary known means. In the case of a flat surface the pattern is similarly prepared, coated with sulfurized caoutchouc, and the latter is vulcanized on the pattern.

We will more fully describe our said improvements with reference to the accompanying drawings, in which—

Figure 1 shows a pattern-roller in elevation and the caoutchouc cover thereon in section. Fig. 2 corresponds with Fig. 1, but shows the cover in the first stage of its removal. Figs. 3 and 4 illustrate in what manner the cover is converted into a mold or matrix. In Fig. 3 a portion of the upper part of the cover is cut away. Fig. 5 shows a flat matrix and frame ready for the reproduction of a flat printing-surface; Fig. 6, a vertical section of Fig. 5, and Fig. 7 a vertical section through the finished printing-block. Figs. 8 and 9 show in plan and vertical section, respectively, a modified construction of the supports for flat printing-surfaces.

The pattern-roller *p*, which is shown with a simple design thereon, is first coated with sulfurized caoutchouc, which is then vulcanized in position, as hereinbefore described. One end of the vulcanized cover is then turned over, as indicated by Fig. 2, and this end is drawn down outside the cover, so that the roller is stripped, and at the same time the separated cover is turned outside in. The next step is to turn the cover inside in. This is effected best by turning one edge of the cover down inside, as shown by Fig. 3, and by seizing the turned-in part with hooks and pulling it through the cover. If the matrix which is thus produced does not possess sufficient stability to withstand the pressure of the after part of the process, it may now be inserted into a supporting-tube *a*, Fig. 4.

The matrix being in position for casting, the central core or "stock" on which the printing-surface is to be supported is inserted and the fluid glue and glycerin mixture is poured in exactly as in molding printers' inking-rollers. There is thus produced a printing-roller without joint or mark and in all respects ready for immediate use.

We overcome the at present fatal defect in attempting to reproduce printing-surfaces of the types to which our improvements relate by means which are very simple, but which nevertheless have not been arrived at without prolonged experiments and losses. We insure that the surface of the matrix is thoroughly and effectively wetted when the cast is made. If this be done, air-bubbles and similar defects cannot be produced on the surface, and a much finer and better result is secured. It is necessary to see that the wetting is really effective and that no air-bubbles are entangled in the water on the matrix. If there be any, they should be removed by a feather or brush. Nothing is better for wetting the matrix than cold water, although certain other liquids may be employed. Contrary to what would be anticipated, the water on the matrix does not mix in the least degree with the glue and glycerin mixture, but is entirely displaced by it. If instead of a cylindrical pattern a flat surface has to be reproduced, the pattern is coated with sulfurized caoutchouc, as already described, and this is vulcanized and stripped off to form the matrix $c'$, Figs. 5 and 6. The matrix is arranged on a table face upward, and a simple frame is placed over it of such a size as to include the pattern. The surface of the matrix having then been effectively wetted, the fluid composition is poured into the frame $f$ until the latter is filled. When the block to be reproduced is of considerable size, and advantageously in all cases, the interior of the frame $f$ is fitted with supports, which may be either the mid-positioned wires $w$ or the wire-work $w'$, Figs. 8 and 9, or other devices of an analogous kind.

It will have been understood that after the printing-roller has been cast the matrix is stripped off it in the same manner as it was originally stripped off the pattern-roller and that it is afterward reversed for subsequent use.

The material which we have found best adapted for the production of our improved printing-surfaces is the "roller composition" of which typographic printers' rollers are made, but other suitable compositions and materials may be used. For example, a flat gutta-percha printing-surface may be made by heating gutta-percha to about 100° centigrade and pressing the then plastic mass upon the wetted matrix.

Having now particularly described our said invention, we declare that what we claim is—

The manufacture or production of flat printing-surfaces of the class described, which consists in coating the pattern with sulfurized caoutchouc and vulcanizing it in position, placing the removed vulcanized matrix face upward, arranging thereon a frame containing internal supports, effectively wetting the face of the matrix, and casting the printing-surface within the frame so that the supports are included therein, substantially as set forth.

In witness whereof we have subscribed our signatures in presence of two witnesses.

THOMAS CHARLES THOMPSON.
WILLIAM EDWIN J. WEBB.

Witnesses:
WILLIAM E. KEYS,
ARTHUR MILLWARD.